US011152791B2

(12) United States Patent
Qin et al.

(10) Patent No.: US 11,152,791 B2
(45) Date of Patent: Oct. 19, 2021

(54) SOLAR ENERGY BASED MOBILE ELECTRIC VEHICLE FAST CHARGER SYSTEM

(71) Applicants: Yu Qin, Troy, OH (US); Shanshan Du, Troy, MI (US)

(72) Inventors: Yu Qin, Troy, OH (US); Shanshan Du, Troy, MI (US)

(73) Assignees: Yu Qin, Troy, OH (US); Shanshan Du, Troy, OH (US)

( * ) Notice: Subject to any disclaimer, the term of this patent is extended or adjusted under 35 U.S.C. 154(b) by 146 days.

(21) Appl. No.: 16/671,806

(22) Filed: Nov. 1, 2019

(65) Prior Publication Data
US 2020/0067319 A1 Feb. 27, 2020

Related U.S. Application Data

(63) Continuation-in-part of application No. 15/615,647, filed on Jun. 6, 2017, now abandoned.

(51) Int. Cl.
| | |
|---|---|
| *H02J 7/00* | (2006.01) |
| *H02J 3/38* | (2006.01) |
| *H02S 10/10* | (2014.01) |
| *H02S 10/40* | (2014.01) |
| *H02S 10/20* | (2014.01) |

(52) U.S. Cl.
CPC ............ *H02J 3/383* (2013.01); *H02J 7/007* (2013.01); *H02S 10/10* (2014.12); *H02S 10/20* (2014.12); *H02S 10/40* (2014.12)

(58) Field of Classification Search
CPC .. H02J 3/383; H02J 7/00; H02S 10/10; H02S 10/20; H02S 10/40; B60J 111/185; B60J 11/18
USPC .................................................. 320/104, 105
See application file for complete search history.

(56) References Cited

U.S. PATENT DOCUMENTS

| | | | | |
|---|---|---|---|---|
| 7,057,303 | B2 * | 6/2006 | Storm | B60K 25/06 290/1 A |
| 9,592,742 | B1 * | 3/2017 | Sosinov | B60L 53/126 |
| 2012/0303397 | A1 * | 11/2012 | Prosser | B60L 53/00 705/7.12 |
| 2014/0375272 | A1 * | 12/2014 | Johnsen | B60L 50/71 320/136 |
| 2015/0183329 | A1 * | 7/2015 | Nakaya | H02S 40/38 307/9.1 |
| 2016/0176305 | A1 * | 6/2016 | James | B60L 53/11 307/26 |
| 2017/0136902 | A1 * | 5/2017 | Ricci | B60L 53/36 |
| 2017/0136903 | A1 * | 5/2017 | Ricci | B64C 39/024 |

* cited by examiner

*Primary Examiner* — Albert K Wong

(57) ABSTRACT

A solar energy based mobile EV fast charger system comprising a stationary solar power supply and a mobile EV fast charger installed in a service truck which has a bidirectional Multi-Functional Power Converter System (MFPCS), a solar energy based on-board battery, multiple DC inductors, a alternator power interface and an universal battery interface provides mobile EV charging service for any EV battery.

8 Claims, 14 Drawing Sheets

| Transformer Re-Configuration Switches | | | | | | | | | Effective Transformer Turns Ratio | EV Battery Voltage Range |
|---|---|---|---|---|---|---|---|---|---|---|
| CT1 | CT2 | CT3 | CT4 | CT5 | CT6 | CT7 | CT8 | CT9 | | |
| 0 | 1 | 1 | 0 | 1 | 1 | 0 | 1 | 1 | 0.75 | 150V – 210V |
| 1 | 0 | 0 | 0 | 1 | 1 | 1 | 0 | 0 | 1.5 | 300V – 420V |
| 1 | 0 | 0 | 1 | 0 | 0 | 1 | 0 | 0 | 3.0 | 600V – 840V |

FIG. 14

SOLAR ENERGY BASED MOBILE ELECTRIC VEHICLE FAST CHARGER SYSTEM

CROSS-REFERENCE TO RELATED APPLICATIONS

This application claims the benefit of U.S. patent application Ser. No. 15/615,647 and hereby incorporates the application by reference.

TECHNICAL FIELD

The present invention relates to non-stationary high power Electric Vehicle (EV) fast charger using a solar based on-board battery as its energy source, capable of providing mobile EV fast charging services for any EV battery, such as but not limited to solar energy based mobile Electric Vehicle (EV) fast charger system.

BACKGROUND

It is well known that Electric Vehicle (EV) can reduce pollution by increasing Mile Per Gallon Equivalent (MPGe) which relies on how EV batteries are charged. In fact EV chargers are facing many challenges. The first challenge is battery charging time, usually up to 8 or 10 hours or more. The second challenge is the lack of EV charging infrastructure resulting in EVs stranding on the road if there is no charging station nearby. The third challenge is that most of energy source used for charging EV battery come from fossil-fuel or coal causing significant reduction of MPGe. The fourth challenge is that EVs have different battery voltage range and current EV DC chargers can only be used for one particular battery voltage range, for example 150v-210V, or 300 v-420 v, or 600 v-840 v. The fifth challenge is that all renewable energy based battery chargers are using multiple power conversions leading to high cost and low efficiency. Therefore, a low cost and high efficient solar energy based mobile EV fast charger system capable of charging any EV battery with different voltage ranges is desired to meet above mentioned challenges.

There are several attempts in prior art addressing the challenges mentioned above separately. For example, Racci (2017/0136902, 2017/0136903) teaches various ways to charge EVs. However Racci's inventions deal with wireless battery charger. Comparing to wired battery charger, wireless battery charger suffers the following deficiencies: increased cost, weight, energy losses and charging noise, limited power, and incompatibility with various EV charging plug-in standards, etc. James (US20160176305A1) teaches a multi-functional power management system (MFPMS) having bidirectional power converters using multi-stage power conversion for residential home, including PV inverter, EV charger, home power system, and power quality correction as shown in his patent FIG. 3. For example, in EV charger mode (as shown in his patent FIGS. 7 and 12) solar energy is converted to HF AC (with power switches 1209, 1210, 1211, 1212), HF AC is then converted to DC (with power switches 1205, 1206, 1207, 1208), DC is then converted to Grid AC (with power switches 1201,1202, 1203,1204), finally Grid AC is plugged into an EV on-board charger (OBC) (which itself has another three power stages: Grid AC to DC, DC to HF AC, and then HF AC to EV battery DC https://powerpulse.net/6-6-kw-bi-directional-ev-on-board-charger-reference-design/) to charge an EV battery. It leads to substantial power loss and lower efficiency because of multi-stage power conversion. The techniques disclosed in Pat. Application WO 2012178010 A1, U.S. Pat. No. 6,979,913 B2 and U.S. Pat. No. 7,057,303 B2 represent the prior art of mobile EV chargers which use EV on board charger (OBC) and regular fossil fuel powered generator as its power source to charge EV battery, so that it decreases MPGe significantly and takes longer charging time due to low power of (OBC).

The prior art has not set forth a solar energy based mobile EV fast charger system that has a stationary solar power supply, a bidirectional multi-functional power conversion system (MFPCS) and an universal battery interface. The object of this invention is to provide a solar energy based mobile EV fast charger system that has high power, high efficiency, but low cost, and capable of charging any EV battery with different voltage ranges.

SUMMARY

One non-limiting aspect of the present invention contemplates a multi-function power conversion system (MFPCS) mountable on a vehicle operated as a solar energy based mobile Electric Vehicle (EV) fast charger comprising a three phase Insulated Gate Bipolar Transistor (IGBT) module having a DC port connected to a solar energy source and an on-board battery and a AC port connected to an stationary solar power supply, a Digital Signal Processor (DSP) controller, a DC-link capacitor, a voltage sensor, a DC current sensor, a plurality of AC current sensors and operating in operation mode 6 (i.e., solar energy charging on-board battery and generating AC grid power).

One non-limiting aspect of the present invention contemplates the MFPCS with the AC port connected to a plurality of DC inductors which are connected to the solar energy source and the DC port connected to the on-board battery further operating in operation mode 4 (i.e., solar energy charging on-board battery).

One non-limiting aspect of the present invention contemplates the MFPCS with the AC port connected to a universal battery interface that is connected to an EV battery and the DC port connected to the on-board battery further operating in operation mode 1 (i.e., on-board battery charging EV battery).

One non-limiting aspect of the present invention contemplates the MFPCS with the AC port connected to the universal battery interface that is connected to an EV battery and an alternator interface that is connected to an alternator power, and the DC port connected to the on-board battery further operates in operation mode 2 (i.e., on-board battery and/or alternator power charging EV battery).

One non-limiting aspect of the present invention contemplates the MFPCS with the AC port connected to an alternator interface that is connected to an alternator power, and the DC port connected to the on-board battery further operates in operation mode 3 (i.e., alternator power charging on-board battery).

One non-limiting aspect of the present invention contemplates the MFPCS with the AC port connected to LCL filter plus transformer that is connected to an AC grid power and the DC port connected to the on-board battery further operates in operation mode 5 (i.e., AC grid power charging on-board battery).

One non-limiting aspect of the present invention contemplates the MFPCS further comprising Mode 1 control library used for operation mode 1 consisting of High Frequency (HF) isolated EV fast charger control algorithms, Mode 2 control library used for operation mode 2 consisting of HF isolated EV fast charger control and DC/DC boost converter control algorithms, Mode 3 control library used for operation mode 3 consisting of DC/DC boost battery charger control algorithms, Mode 4 control library used for operation mode 4 consisting of interleaved multi-phase on-board battery charger control algorithms, Mode 5 control library used for operation mode 5 consisting of Pulse Width Modulation (PWM) rectifier battery charger control algorithms, and Mode 6 control library used for operation mode 6 consisting of three phase grid-tied inverter control and direct on-board battery charger control algorithms.

One non-limiting aspect of the present invention contemplates HF isolated EV fast charger control algorithms to charge EV battery with on-board battery comprising an EV battery data base of voltage, current, temperature, state of charge (SOC), age, chemistry, charging requirements for all EV battery system, a battery voltage controller, a battery current controller, a DC current controller, a full bridge PWM unit and an user interface and/or communication interface.

One non-limiting aspect of the present invention contemplates DC/DC boost converter control algorithms to regulate the DC-link voltage of MFPCS with truck alternator power source comprising a DC voltage controller, a DC current controller, and a boost PWM unit.

One non-limiting aspect of the present invention contemplates DC/DC boost battery charger control algorithms to charge on-board battery with truck alternator power comprising a battery voltage controller, a battery current controller, a DC current controller, and a boost PWM unit.

One non-limiting aspect of the present invention contemplates interleaved multi-phase battery charger control algorithms to charge on-board battery with solar energy when solar energy voltage is less than battery voltage ($V_{MP}<V_B$) comprising an optimal solar energy tracking unit, a battery voltage controller, a multi-phase current controller, and an interleaved multi-phase PWM unit.

One non-limiting aspect of the present invention contemplates PWM rectifier battery charger control algorithms to charge on-board battery with AC grid power comprising a battery voltage controller, a battery current controller, an AC current reference generation unit, an AC current controller and a Space Vector Modulation (SVM) unit.

One non-limiting aspect of the present invention contemplates three phase grid-tied inverter control with direct on-board battery charger control algorithms to produce AC grid power and charge on-board battery directly with solar energy when solar energy voltage is greater than battery voltage ($V_{MP}>V_B$) comprising a maximum power point tracking (MPPT) unit, a DC voltage controller, a required battery power calculation unit, an inverter command generation unit, an AC current reference generation unit, an AC current controller, and a SVM unit.

One non-limiting aspect of the present invention contemplates a universal battery interface providing an interface to adapt any EV battery voltage range comprising two identical re-configurable HF transformers, a plurality of transformer re-configuration switches, a diode rectifier circuit, an output L-C filter circuit, and a transformer re-configuration switch control table.

One non-limiting aspect of the present invention contemplates a re-configuration of HF transformers comprising one primary winding and two secondary windings with primary winding connected in parallel while secondary windings connected in combination of series and/or parallel to match mobile EV fast charger voltage with any EV battery.

One non-limiting aspect of the present invention contemplates a plurality of transformer re-configuration switches being controlled based on a transformer re-configuration control table.

BRIEF DESCRIPTION OF THE DRAWINGS

FIG. 14 illustrates a transformer re-configuration switch control table as contemplated by one non-limiting aspect of the present invention.

DETAILED DESCRIPTION

The following description and the drawings illustrate specific embodiments sufficiently to enable those skilled in the art to practice the system and method described. Other embodiments may incorporate structural, logical, process and other changes. Examples merely typify possible variations. Individual elements and functions are generally optional unless explicitly required, and the sequence of operations may vary. Portions and features of some embodiments may be included in, or substituted for, those of others. Unless otherwise defined, all technical and scientific terms used herein have the same meaning as commonly understood by one of ordinary skill in the art to which this invention belongs. For the following defined terms, these definitions shall be applied, unless a different definition is given in the claims or elsewhere in this specification. "MFPCS" is defined herein as multi-purpose power converter used to convert DC to DC (DC/DC), or DC to AC (DC/AC), or AC to DC (AC/DC). "IGBT module" is defined as a group of IGBTs packaged into one module. "Power converter" is made of one or several IGBT modules. "IGBT Gate Driver" is defined as an integrated circuit that accepts a low power input from a Digital Signal Processor (DSP) and produces the appropriate voltage and current for an IGBT module. "DSP controller" is defined as a specialized microprocessor with its architecture optimized for the operational needs of digital signal processing. "On-board battery" is defined herein as meaning a large capacity high voltage battery mounted on a service truck and used to charge EV battery. "Battery voltage controller", "Battery current controller", "DC voltage controller", "DC current controller", "AC current controller" are defined as feedback controllers that consist of Proportional and Integral (PI) controllers which continuously calculate error values as the difference between voltage/current reference and feedback voltage/current and apply correction. "Full Bridge (F.B.) PWM", "Boost PWM", "Multi-Phase Interleaved PWM", "Space vector modulation (SVM)" are defined as pulse width modulation (PWM) techniques used in HF isolated EV fast charger, DC/DC boost converter, interleaved multi-phase on-board battery charger, and three phase inverter respectively. "AC current reference generation" is defined as AC waveform generation technique, its amplitude depends on inverter power command and its frequency depends on the frequency of AC grid power. "Maximum power point tracking (MPPT)" is defined as a technique used with solar power converter to maximize power extraction under all conditions. "Required battery power calculation" is the multiplication of measured battery voltage and required battery charging current.

Figure 1:
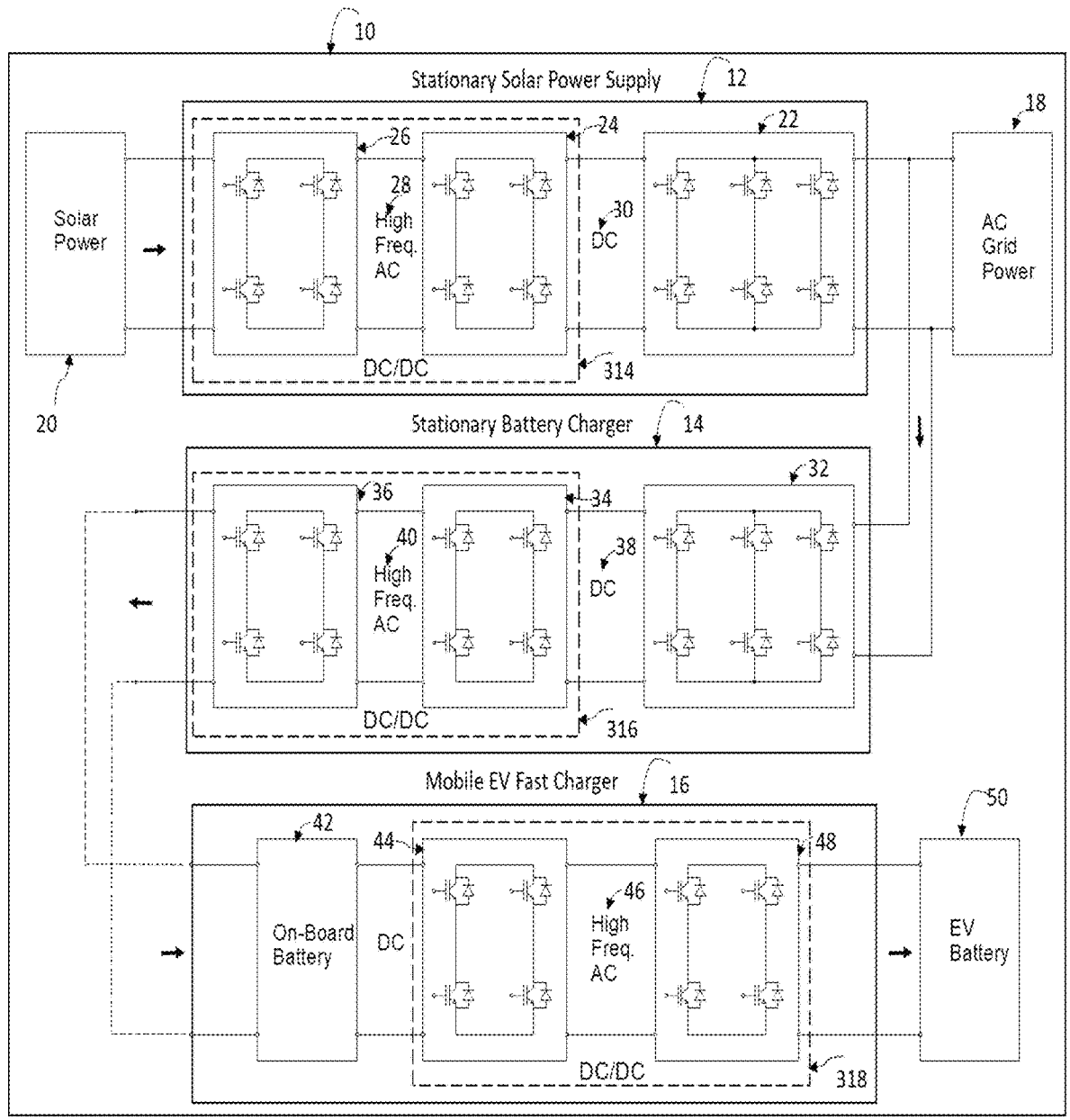
FIG. 1 illustrates the block diagram for a prior art power conversion hardware configuration of solar energy based mobile EV fast charger system.

FIG. 1 illustrates a prior art power conversion hardware configuration of solar energy based mobile EV battery charger system 10. It consists of three portions: stationary solar power supply 12 that consists of DC/DC converter 314 and three-phase inverter 22 to generate AC grid power 18 from solar power 20 (i.e. power converter 26 converting solar power 20 to High Frequency (HF) AC 28, power converter 24 converting HF AC 28 to DC voltage 30, and three-phase inverter 22 converting DC voltage 30 to three phase AC grid power 18), stationary DC fast charger 14 that consists of three-phase rectifier 32 and DC/DC converter 316 to recharge on-board battery 42 (used as power source in mobile EV charging service) with AC grid power 18 (i.e. three-phase rectifier 32 converting three phase AC grid power 18 to DC voltage 38, power converter 34 converting DC voltage 38 to HF AC 40, then power converter 36 charging on-board battery 42 with HF AC 40), and mobile EV DC fast charger 16 (installed on a service truck) that consists of DC/DC converter 318 to charge EV battery 50 with on-board battery 42. (i.e. power converter 44 converting DC voltage of on-board battery 42 to HF AC 46, and power converter 48 charging EV battery 50 with HF AC 46). Therefore, prior art solar energy based mobile EV charger system 10 consists of eight (8) power converters (22, 24, 26, 32, 34, 36, 44, and 48). Each power converter may cause power loss as a result of lower efficiency and high cost. And also system 10 can only be used for one fixed EV battery voltage range, for example 150v-210 v or 300 v-420 v or 600 v-840 v.

Figure 2A:
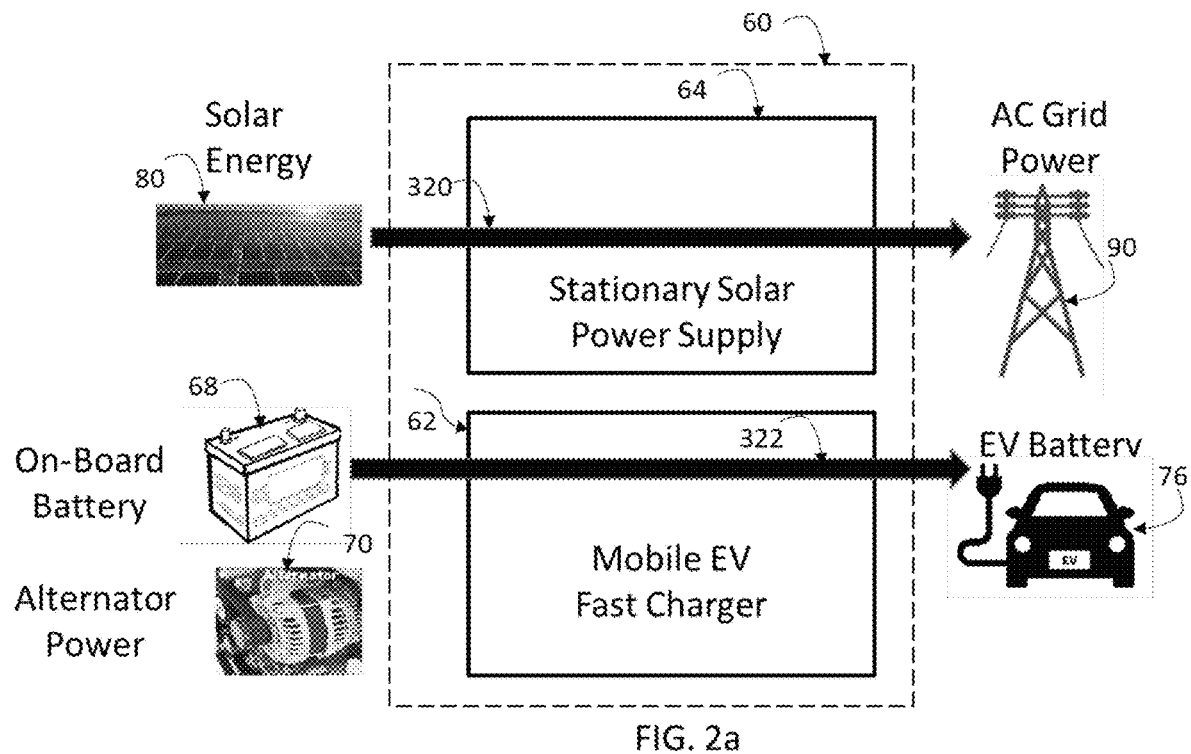
FIG. 2a illustrates the functional block diagrams of a solar energy based mobile EV fast charger system in operation mode 1 (on-board battery charging EV battery) as contemplated by one non-limiting aspect of the present invention.
Figure 2B:
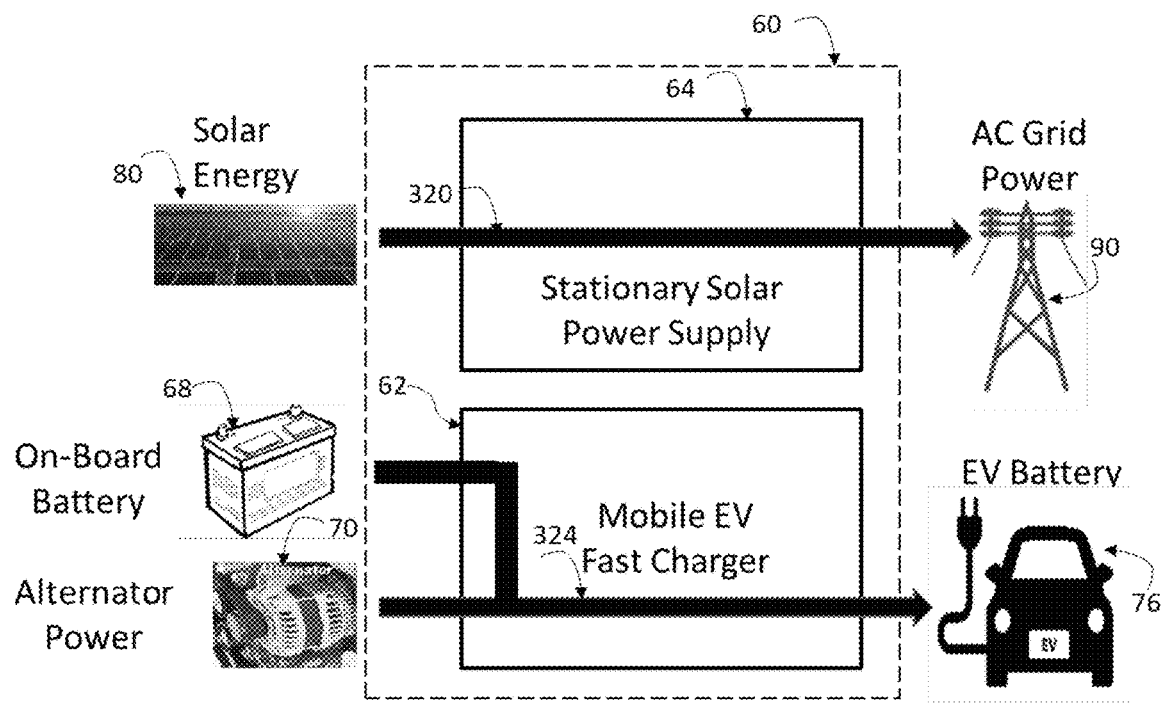
FIG. 2b illustrates the functional block diagrams of a solar energy based mobile EV fast charger system in operation mode 2 operation mode 2 (on-board battery and/or truck alternator power source charging EV battery) as contemplated by one non-limiting aspect of the present invention.
Figure 2C:
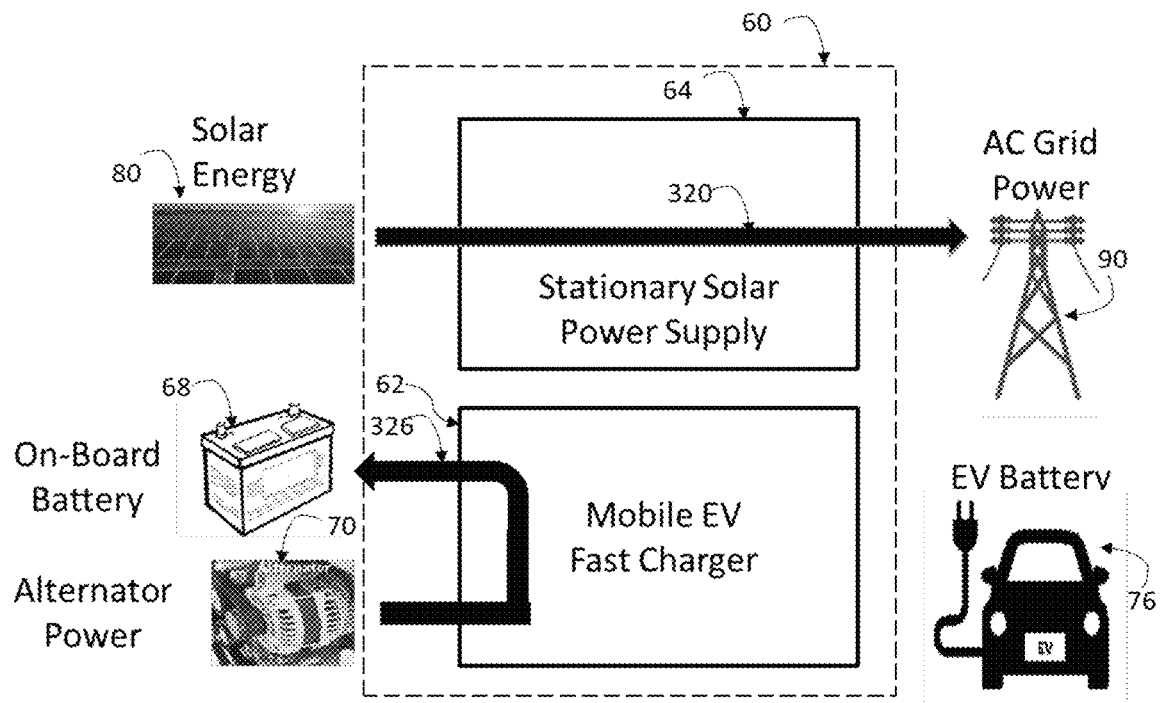
FIG. 2c illustrates the functional block diagrams of a solar energy based mobile EV fast charger system in operation mode 3 (truck alternator power source charging on-board battery) as contemplated by one non-limiting aspect of the present invention.
Figure 2D:
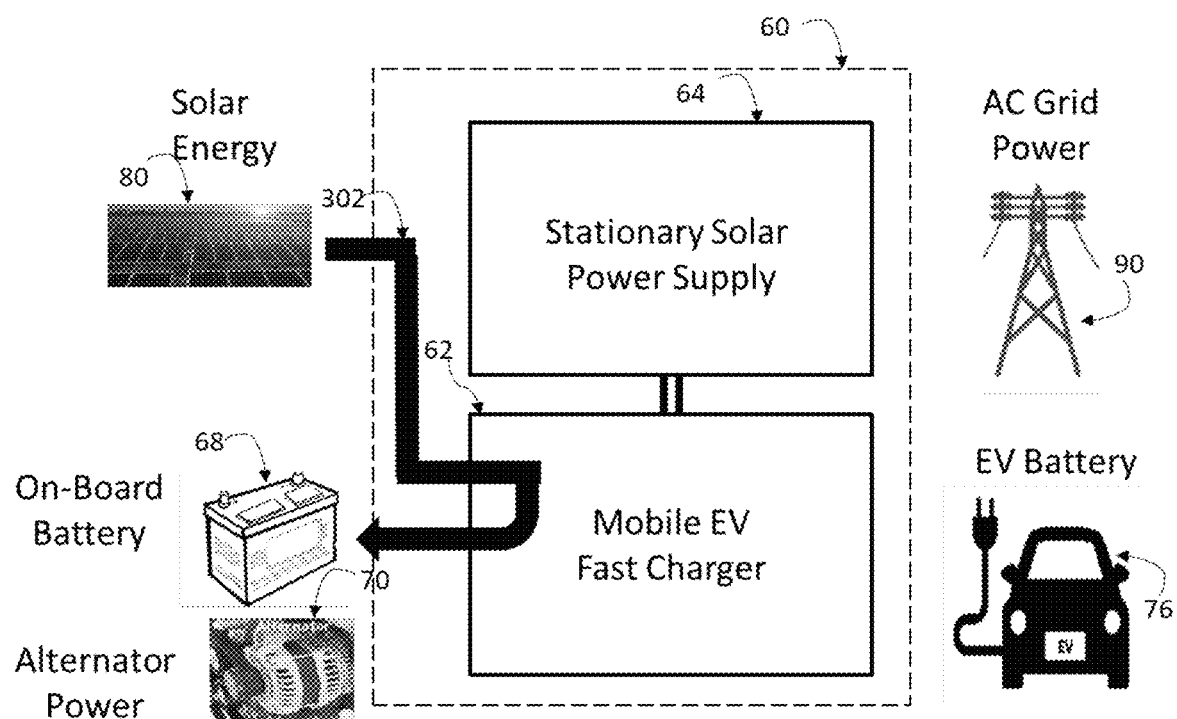
FIG. 2d illustrates the functional block diagrams of a solar energy based mobile EV fast charger system in operation mode 4 (solar energy charging on-board battery) as contemplated by one non-limiting aspect of the present invention.
Figure 2E:
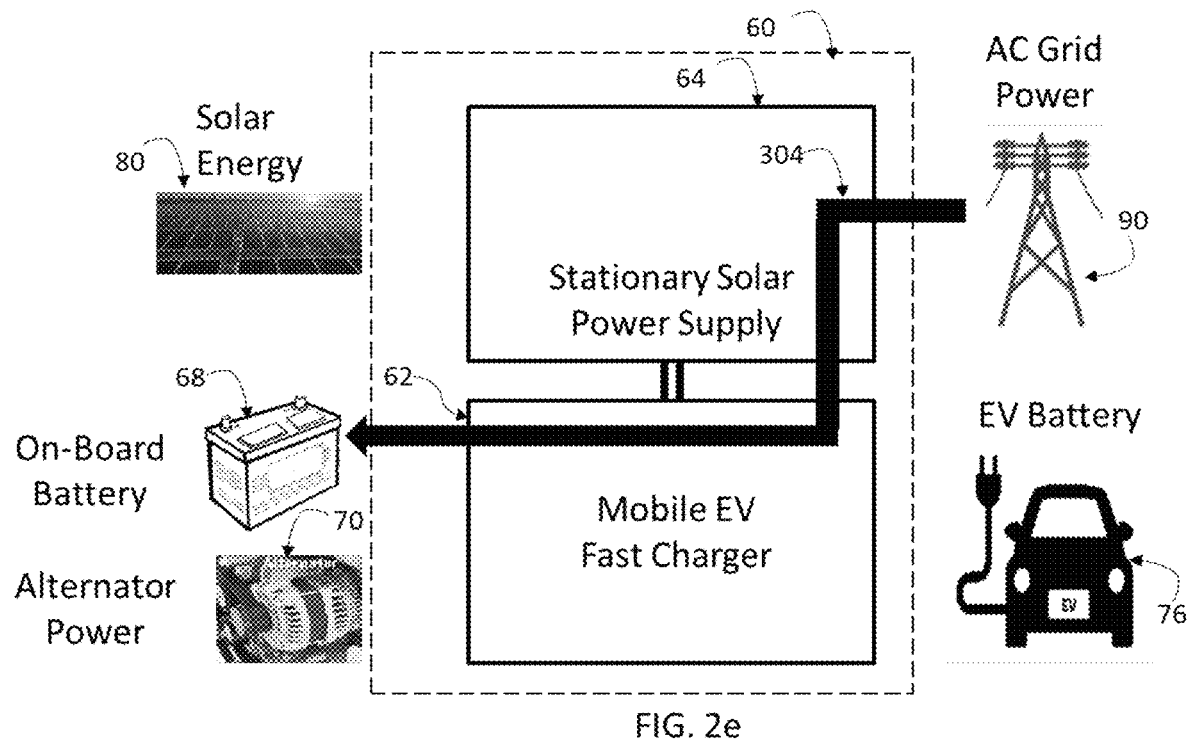
FIG. 2e illustrates the functional block diagrams of a solar energy based mobile EV fast charger system in operation mode 5 (AC grid power charging on-board battery) as contemplated by one non-limiting aspect of the present invention.
Figure 2F:
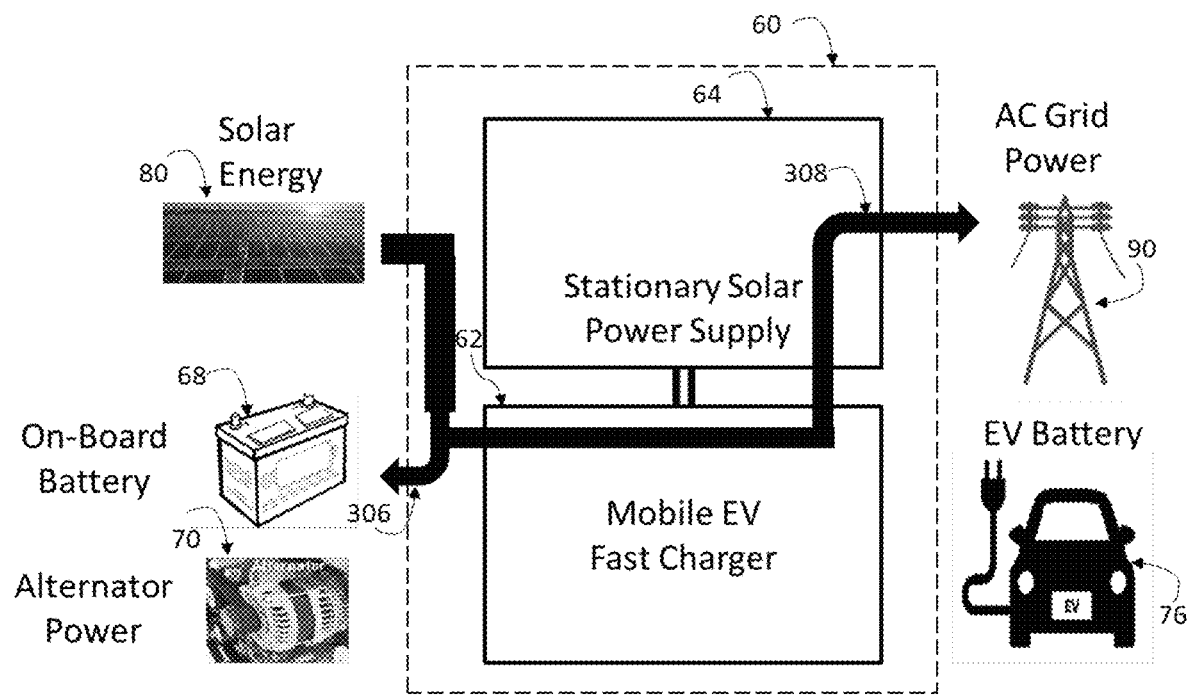
FIG. 2f illustrates the functional block diagrams of a solar energy based mobile EV fast charger system in operation mode 6 (solar energy charging on-board battery and generating AC grid power) as contemplated by one non-limiting aspect of the present invention.

FIGS. 2a-2f illustrate the functional block diagrams of a solar energy based mobile EV fast charger system 60 operated in operation mode 1 to 6 as disclosed in present invention. FIG. 2a illustrates the operation mode 1 where Stationary Solar Power Supply 64 may produce AC Grid Power 90 with Solar Energy 80 into via power flow 320 and Mobile EV DC Fast Charger 62 may charge EV Battery 76 with On-Board Battery 68 via power flow 322. FIG. 2b illustrates the operation mode 2 where Stationary Solar Power Supply 64 may produce AC Grid Power 90 with Solar Energy 80 via power flow 320 and Mobile EV DC Fast Charger 62 may charge EV Battery 76 with On-Board Battery 68 and/or the Alternator Power 70 via power flow 324. FIG. 2c illustrates the operation mode 3 where Stationary Solar Power Supply 64 may produce AC Grid Power 90 with Solar Energy 80 via power flow 320 and Mobile EV DC Fast Charger 62 may charge On-Board Battery 68 with the Alternator Power 70 via power flow 326. FIG. 2d illustrates the operation mode 4 where Mobile EV DC Fast Charger 62 may charge On-Board Battery 68 with Solar Energy 80 via power flow 302. FIG. 2e illustrates the operation mode 5 where Mobile EV DC Fast Charger 62 may charge On-board Battery 68 with AC Grid Power 90 via power flow 304. FIG. 2f illustrates the operation mode 6 where Mobile EV DC Fast Charger 62 may charge On-Board Battery 68 with part of Solar Energy 80 via power flow 306 and feed extra solar energy to AC Grid Power 90 via power flow 308.

Figure 3:
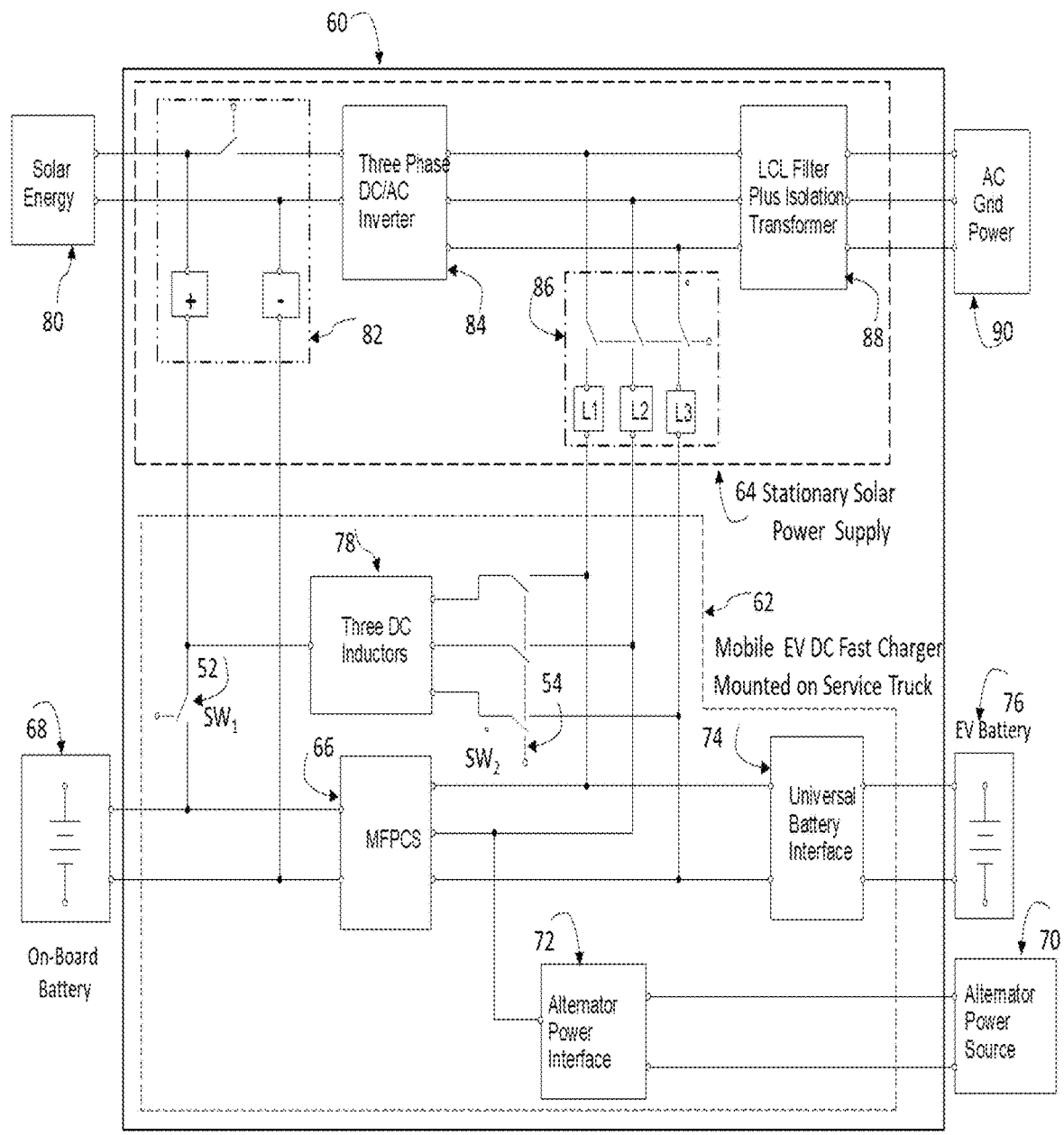
FIG. 3 illustrates a structure of solar energy based mobile EV fast charger system as contemplated by one non-limiting aspect of the present invention.

FIG. 3 illustrates the structure of solar energy based mobile EV fast charger system 60. Mobile EV fast charger 62 mountable on a service truck comprises Multi-Functional Power Conversion Systems (MFPCS) 66, Universal Battery Interface 74, Alternator Power Interface 72, Three DC inductors 78, and operation switches SW 52, $SW_2$ 54. Stationary Solar Power supply 64 comprises Three-Phase DC/AC Inverter 84, LCL filter Plus Isolation Transformer 88, and mobile on-board battery recharging interfaces 82, 86. MFPCS 66 is configured and operated in operation mode 1 to 2 to charge EV Battery 76, and in mode 3 to mode 6 to charge On-Board Battery 68. MFPCS 66 connected with On-Board Battery 68 and Universal Battery Interface 74 may operate in operation mode 1. MFPCS 66 connected with on-board battery 68, Alternator Power Interface 72 and Universal Battery Interface 74 may operate in operation mode 2. MFPCS 66 connected with On-Board Battery 68 and Alternator Power Interface 72 may operate in operation mode 3. MFPCS 66 connected with On-Board Battery 68 and Three DC Inductors 78 which are further connected with Solar Energy 80 through mobile on-board battery recharging interfaces 82 may operate in operation mode 4. MFPCS 66 connected with On-Board Battery 68 and AC Grid Power 90 through mobile on-board battery recharging interfaces 86 may operate in operation mode 5. MFPCS 66 connected with On-Board Battery 68 and Stationary Solar Power Supply 64 which is further connected with Solar Energy 80 and AC Grid Power 90 may operate in operation mode 6. Stationary Solar Power Supply 64 may operate as a three-phase grid-tied solar power converter to produce AC Grid Power 90 with Solar Energy 80 when it is not connected to Mobile EV DC Fast Charger 62.

Figure 4A:
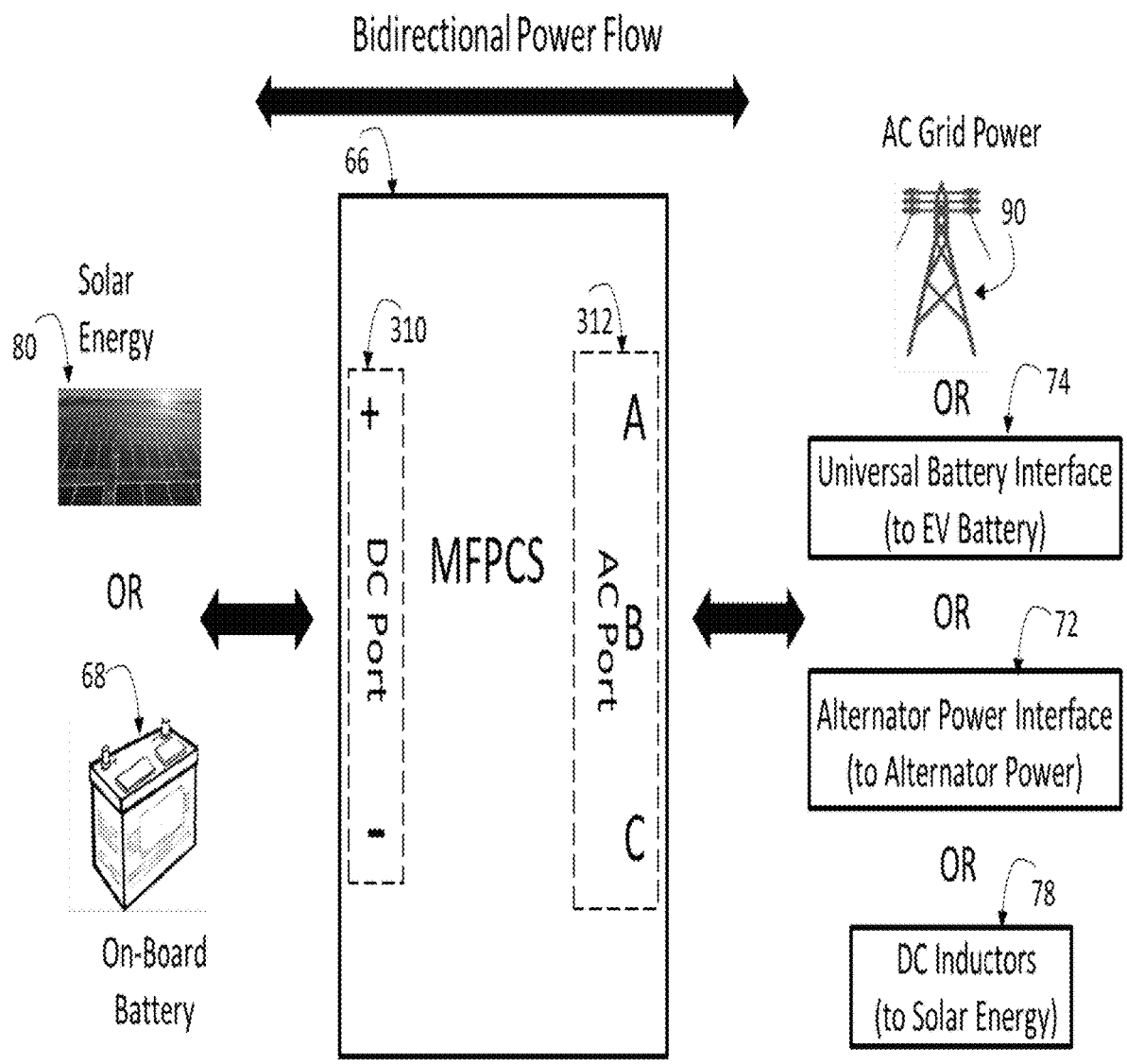
FIGS. 4a and 4b illustrate the interface diagram and the structure of MFPCS as contemplated by one non-limiting aspect of the present invention.

FIG. 4a illustrates the block diagram of a bidirectional Multi-Functional Power Conversion Systems (MFPCS) 66 and its complement of power sources available for switching in or out of use as provided by the disclosed functionality. Power sources may be connected to either DC Port 310 or AC Port 312. MFPCS 66 configuration examples are shown in FIG. 4a for the power converter functions in six (6) operation modes. The present design of MFPCS 66 may provide converter facilities and functionalities using hardware and control algorithms potentially including a tailored set of logic and operations to realize the desired operating capabilities disclosed herein.

Figure 4B:
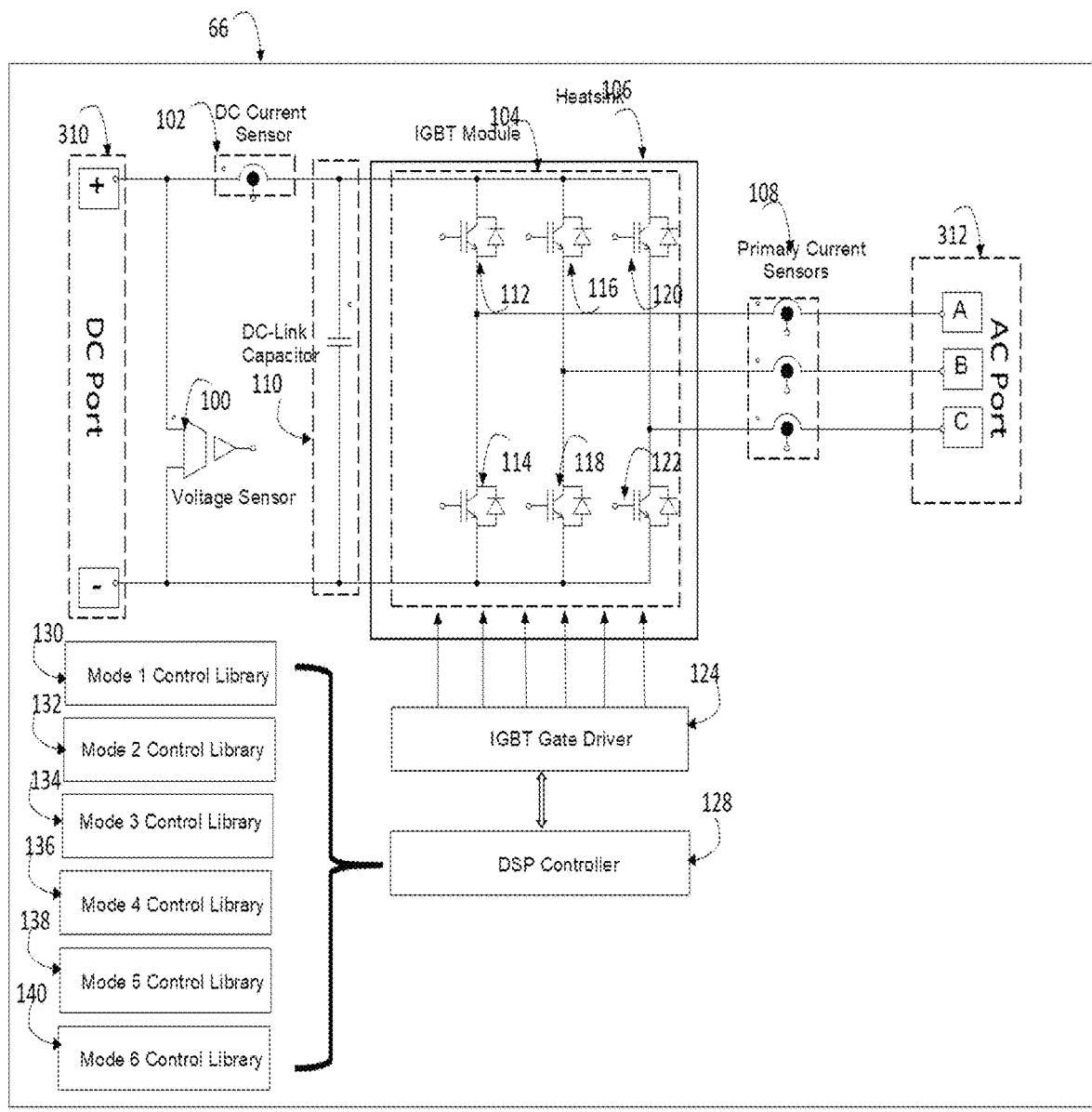

FIG. 4b schematically illustrates the structure of MFPCS 66 comprising Insulated Gate Bipolar Transistor (IGBT) Module 104 which is connected to DC-Link Capacitor 110, DC Port 310, AC Port 312 and mounted on liquid cooled Heatsink 106, Digital Signal Processor (DSP) Controller 128, DC Current Sensor 102, Primary Current Sensors 108, and Voltage Sensor 100. The IGBT module is made of six (6) IGBT switches 112, 114, 116, 118, 120, 122. Primary Current Sensors 108 sense currents of Universal Battery Interface 74 or Three DC Inductors 78 or Alternator Power Interface 72 or AC Grid Power 90 (in FIG. 3) depending on the operation mode and the power source connected to AC Port 312. DC Current Sensor 102 senses currents of Solar Energy 80 or On-Board Battery 68 (in FIG. 3) depending on the operation mode and the power source connected to DC Port 310. Voltage Sensor 100 senses the voltage of the DC Port 310. DSP Controller 128 comprises Mode 1 control library 130 with High Frequency (HF) isolated EV fast charger control algorithms, Mode 2 control library 132 with HF isolated EV fast charger control and DC/DC boost converter control algorithms, Mode 3 control library 134 with DC/DC boost battery charger control algorithms, Mode 4 control library 136 with interleaved multi-phase on-board battery charger control algorithms, Mode 5 control library 138 with PWM rectifier battery charger control algorithms, and Mode 6 control library 140 with three phase grid-tied inverter and direct on-board battery charger control algorithms. With the sensed voltage and current, DSP Controller 128 may implement one of control algorithms in Mode Control Libraries 1 or 2 or 3 or 4 or 5 or 6 for operation mode 1 or 2 or 3 or 4 or 5 or 6 respectively by providing control signals to IGBT Gate Driver 124. With the control signals, IGBT Gate Driver 124 may produce gate drive signals with appropriate voltage and current for IGBT Module 104 to provide battery charging and power conversion functions in operation mode 1 to 6.

Figure 5:
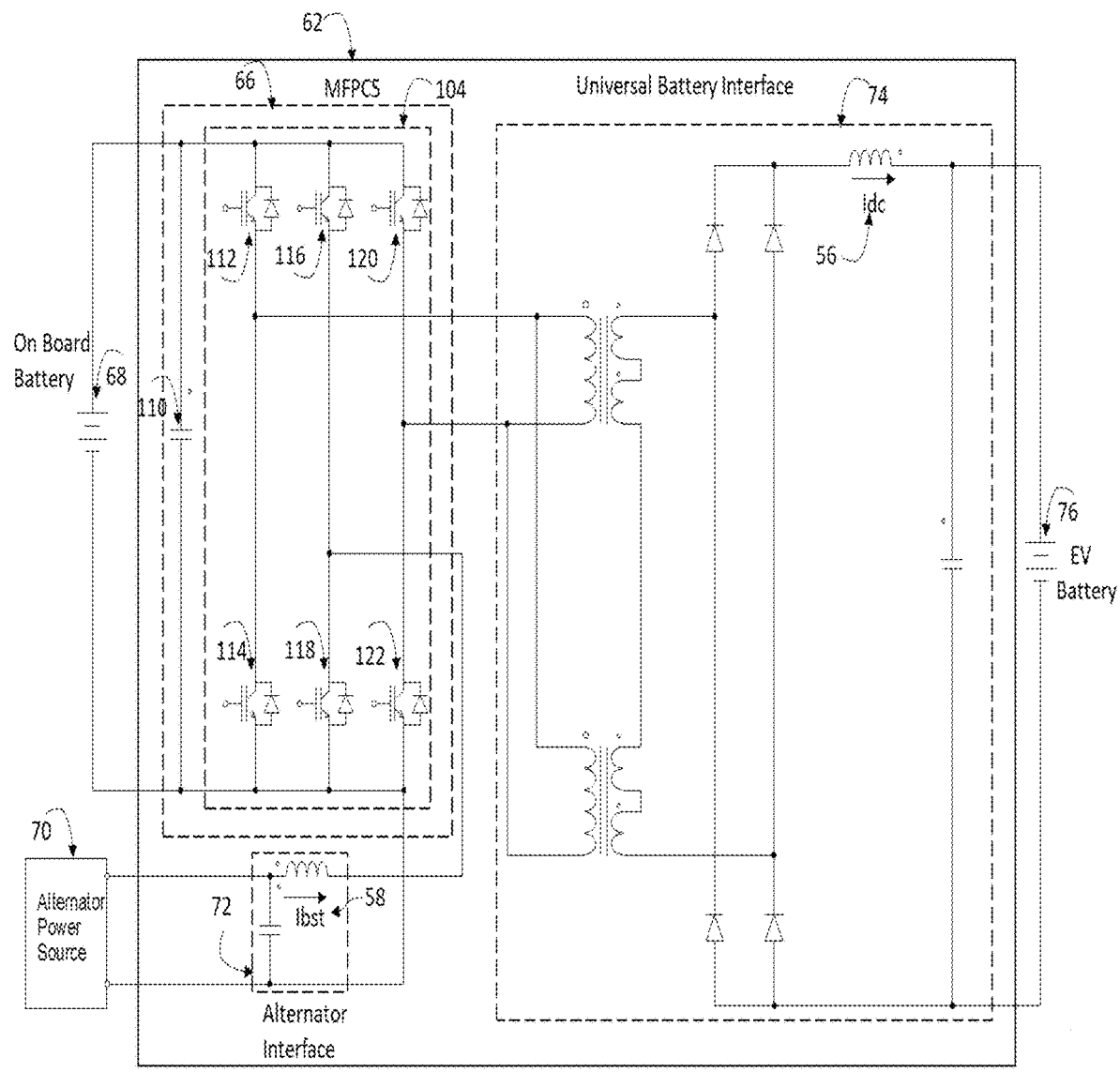
FIG. 5 schematically illustrates the example of solar energy based mobile EV fast charger system configured in operation mode 1, or mode 2, or mode 3 as contemplated by one non-limiting aspect of the present invention.

FIG. 5 schematically illustrates configurations of an exemplary Mobile EV Fast Charger 62 in operation mode 1 or mode 2 or mode 3. In operation mode 1 DC-Link Capacitor 110 of MFPCS 66 through DC Port 310 is connected to On-Board Battery 68 and IGBT switches 112, 114, 120, 122 of MFPCS 66 through AC Port 312 are connected to Universal Battery Interface 74 which is further connected to EV Battery 76, Mode 1 Control Library 130 in DSP Controller 128 generates control signals for IGBT Gate Driver 124 to control IGBT Module 104 (in FIG. 4b) so that EV Battery 76 is charged with On-Board Battery 68. Comparing two (2) IGBT modules 44, 48 being used in prior art of FIG. 1, the operation mode 1 only uses one (1) IGBT Module 104 to charge EV Battery 76 with On-Board Battery 68. In operation mode 2 IGBT switches 116, 118 of MFPCS 66 are connected to Alternator Power Source 70 through AC Port 312 and Alternator Power Interface 72 which consists of an inductor and a capacitor, DC-Link Capacitor 110 of MFPCS 66 through DC Port 310 is connected to On-Board Battery 68 and IGBT switches 112, 114, 120, 122 of MFPCS 66 through AC Port 312 are connected to Universal Battery Interface 74 which is further connected to EV Battery 76, Mode 2 Control Library 132 in DSP Controller 128 generates control signals for IGBT Gate Driver 124 to control IGBT Module 104 (in FIG. 4b) so that EV Battery 76 is charged with On-Board Battery 68 and/or Alternator Power Source 70. Comparing two (2) IGBT modules 44, 48 being used in prior art of FIG. 1, the operation mode 2 only use one (1) IGBT Module 104 to charge EV Battery 76 with On-Board Battery 68 and/or Alternator Power 70. In operation mode 3 DC-Link Capacitor 110 of MFPCS 66 through DC Port 310 is connected to On-Board Battery 68 and IGBT switches 116, 118 of MFPCS 66 are connected to Alternator Power Source 70 through AC Port 312 and Alternator Power Interface 72 which consists of an inductor and a capacitor, Mode 3 Control Library 130 in DSP Controller 128 generates control signals for IGBT Gate Driver 124 to control IGBT Module 104 (in FIG. 4b) so that On-Board Battery 68 is charged with Alternator Power Source 70.

Figure 6:
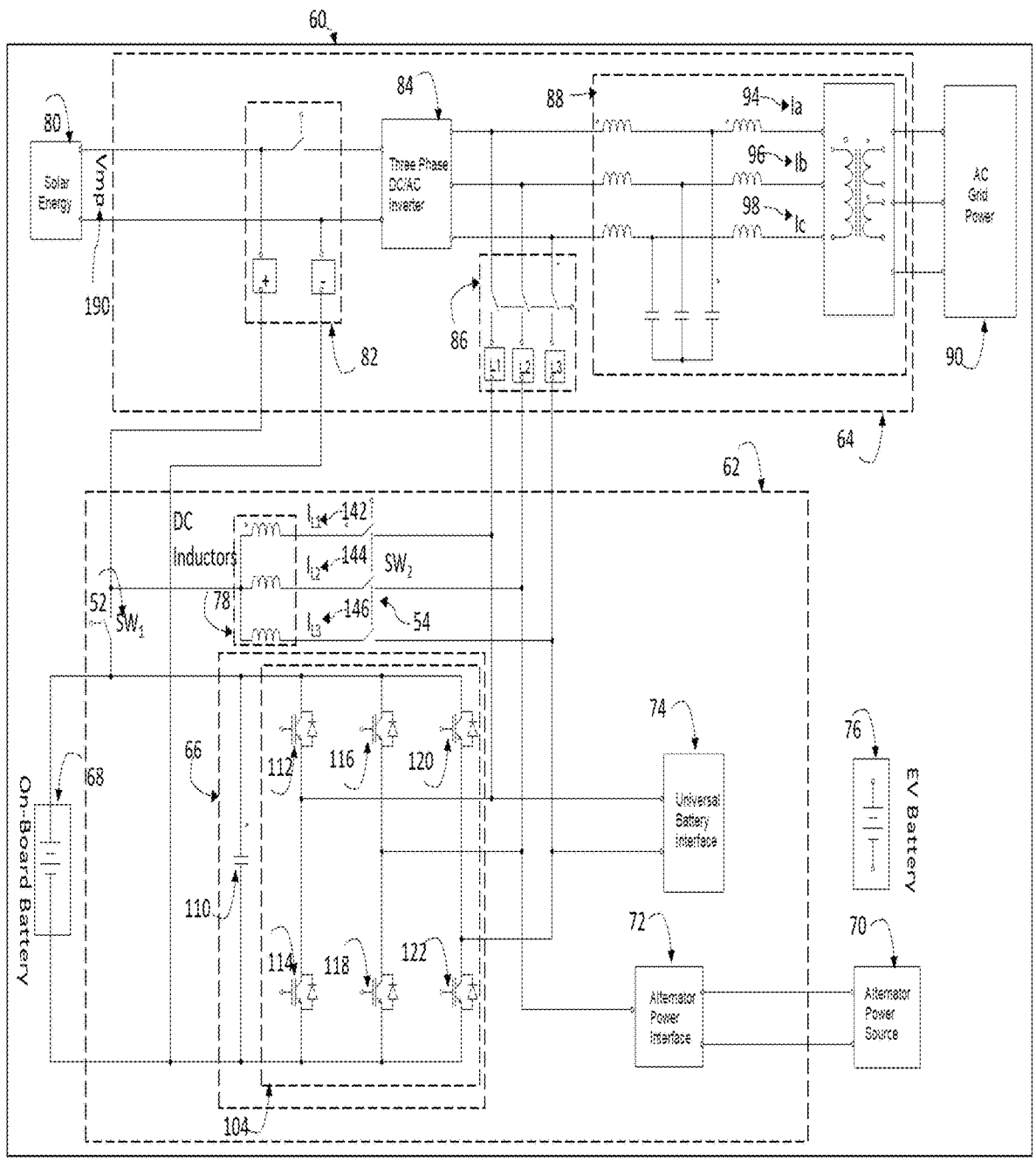
FIG. 6 schematically illustrates the example of solar energy based mobile EV fast charger system configured in operation mode 4, or mode 5, or mode 6 as contemplated by one non-limiting aspect of the present invention.

FIG. 6 schematically illustrates configurations of an exemplary solar energy based mobile EV fast charger system 60 in operation mode 4 or mode 5 or mode 6. In operation mode 4 where solar energy voltage is less than on-board battery voltage ($V_{MP} < V_B$), IGBT switches 112, 114, 116, 118, 120, 122 of MFPCS 66 are connected to Solar Energy Source 80 through AC Port 312, Three DC Inductors 78 and mobile on-board battery recharging interface 82 with operation switch $SW_2$ 54 closed, DC-Link Capacitor 110 of MFPCS 66 through DC Port 310 is connected to On-Board Battery 68, Solar Energy 80 is dis-connected to On-Board Battery 68 with operation switch $SW_1$ 52 open, Mode 4 Control Library 136 in DSP Controller 128 generates control signals for IGBT Gate Driver 124 to control IGBT Module 104 (in FIG. 4b) so that On-Board Battery 68 is charged with Solar Energy Source 80. Comparing six (6) IGBT modules 22, 24, 26, 32, 34, 36 being used in prior art of FIG. 1, the operation mode 4 only use one (1) IGBT Module 104 to charge On-Board Battery 68 with Solar Energy Source 80. In operation mode 5 MFPCS 66 is connected to On-Board Battery 68 through DC Port 310 and connected to AC Grid Power 90 through AC Port 312, mobile on-board battery recharging interface 86, and LCL filter Plus Isolation Transformer 88, Mode 5 Control Library 138 in DSP Controller 128 generates control signals for IGBT Gate Driver 124 to control IGBT Module 104 (in FIG. 4b) so that On-Board Battery 68 is charged with AC Grid Power 90. Comparing three (3) IGBT modules 32, 34, 36 being used in prior art of FIG. 1, the operation mode 5 only use one (1) IGBT Module 104 to charge On-Board Battery 68 with AC Grid Power 90. In operation mode 6 where solar energy voltage is greater than on-board battery voltage ($V_{MP} > V_B$), MFPCS 66 is connected to On-Board Battery 68 and Solar Energy 80 through DC Port 310 and mobile on-board battery recharging interface 82 with operation switch $SW_1$ 52 closed, and connected to AC Grid Power 90 through AC Port 312, mobile on-board battery recharging interface 86, and LCL Filter Plus Isolation transformer 88, Mode 6 Control Library 140 in DSP Controller 128 generates control signals for IGBT Gate Driver 124 to control IGBT Module 104 (in FIG. 4b) so that a part of Solar Energy 80 is used to charge On-Board Battery 68 and extra solar energy is fed to AC Grid Power 90. Comparing six (6) IGBT modules 22, 24, 26, 32, 34, 36 being used in prior art of FIG. 1, the operation mode 6 only use one (1) IGBT Module 104 to charge On-Board Battery 68 and to produce AC Grid Power 90 with Solar Energy Source 80.

Figure 7:
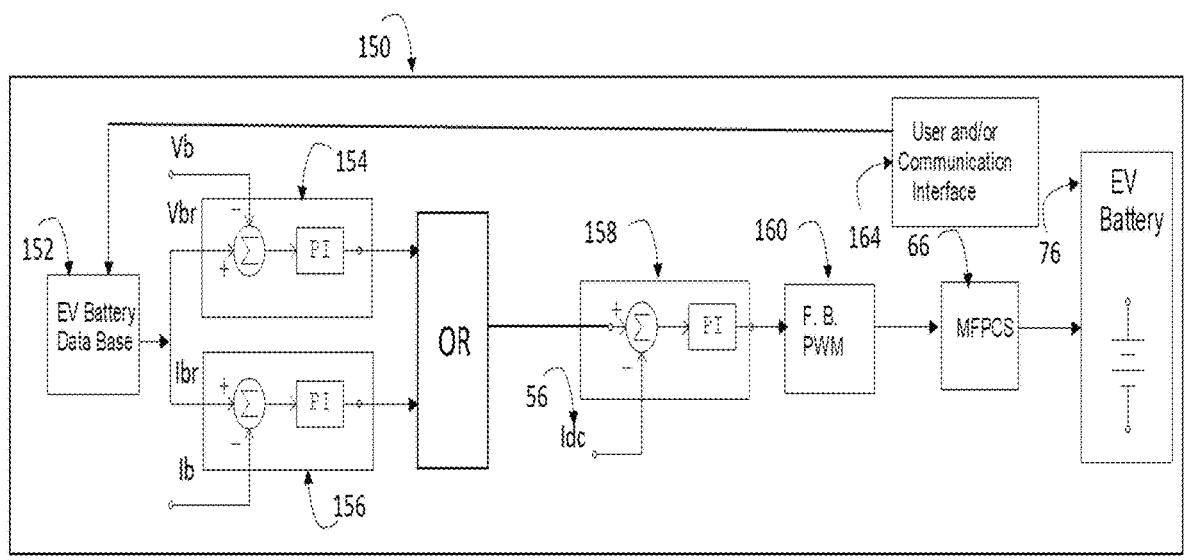
FIG. 7 illustrates the functional block diagram of HF isolated EV fast charger control algorithms with user and/or communication interface in Mode 1 and Mode 2 control libraries as contemplated by one non-limiting aspect of the present invention.

FIG. 7 illustrates the block diagram of HF isolated EV fast charger control algorithms 150 in Mode 1 and Mode 2 Control Libraries. Control algorithms 150 incorporates EV Battery Data Base 152 providing battery voltage reference Vbr and battery current reference Ibr to battery voltage controller 154 and battery current controller 156 based on the battery information including but not limited to EV manufacturer and model number, chemistry, voltage and current ranges, State of Charge (SOC), temperatures and charging requirements of EV batteries. The battery voltage Vb is regulated to battery voltage reference Vbr by battery voltage controller 154 in constant voltage mode; the battery current Ib is regulated to battery current reference Ibr by battery current controller 156 in constant current mode. Using the output from either voltage control 154 or current control 156, DC current controller 158 regulates output current Idc 56 (in FIG. 5) by commanding Full-Bridge (F.B) PWM 160 to generate PWM signals controlling IGBTs 112, 114, 120, 122 of MFPCS 66 to charge EV battery 76 with on-board battery 68 (in FIG. 5). User and/or Communication Interface 164 allows users to select the EV model from EV Battery Data Base 152 so that the corresponding hardware configuration and battery charging control algorithms can be selected before the battery charging process begin.

Figure 8:
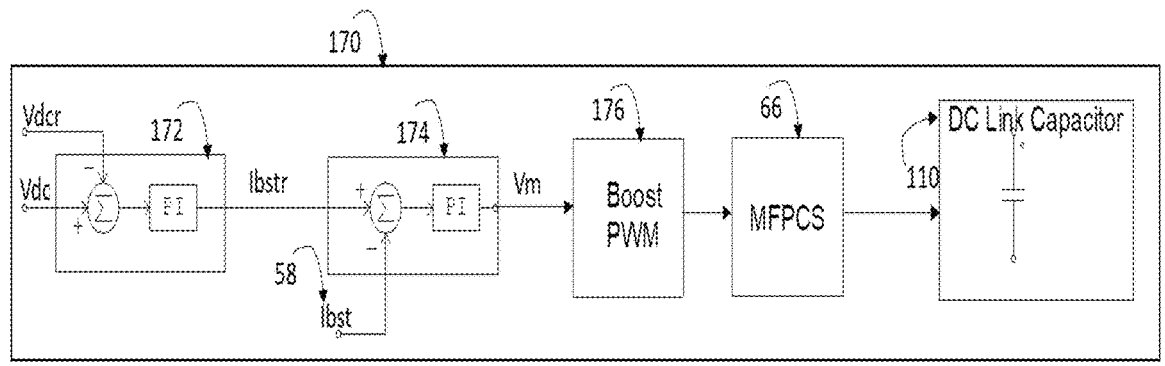
FIG. 8 illustrates the functional block diagram of DC/DC boost converter control algorithms in Mode 2 control library as contemplated by one non-limiting aspect of the present invention.

FIG. 8 illustrates the functional block diagram of DC/DC boost converter control algorithms 170 in Mode 2 Control library which is used in operation mode 2. DC voltage controller 172 regulates the voltage Vdc of DC-link capacitor 110 in MFPCS 66 (in FIG. 5) with reference Vdcr by generating a boost current reference Ibstr for DC current controller 174. Current controller 174 regulates the boost current Ibst 58 (in FIG. 5) with the boost current reference Ibstr by generating a PWM command voltage Vm. Boost PWM 176 generates PWM signals based on the PWM command voltage Vm controlling IGBT switches 116, 118 of MFPCS 66 to boost a low voltage of truck Alternator Power Source 70 to a high voltage of DC-Link Capacitor 110 in MFPCS 66 so as to charge EV Battery 76 with the high voltage of DC-Link Capacitor 110 (in FIG. 5).

Figure 9:
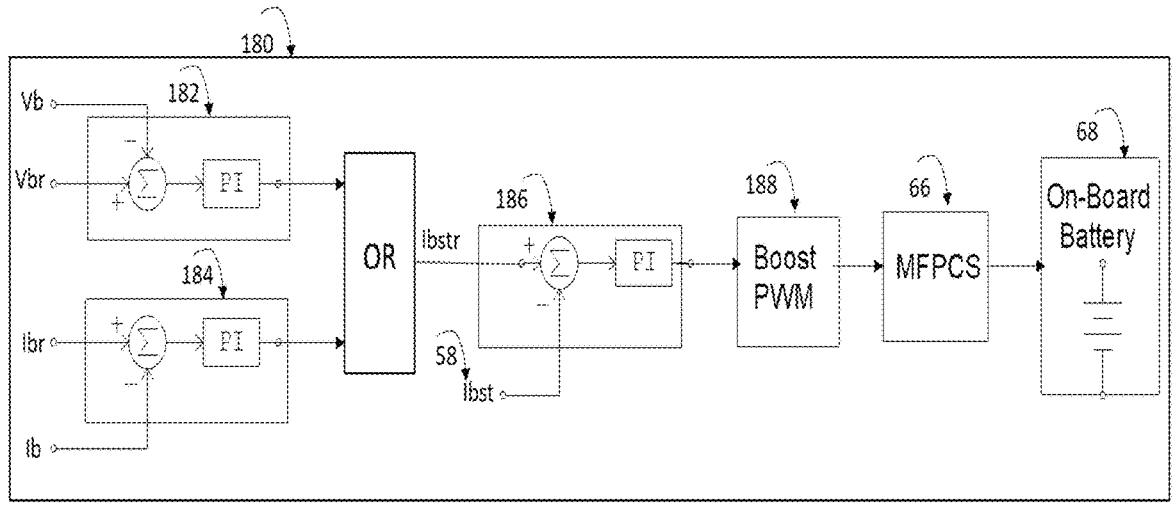
FIG. 9 illustrates the functional block diagram of DC/DC boost battery charger control algorithms in Mode 3 control library as contemplated by one non-limiting aspect of the present invention.

FIG. 9 illustrates the functional block diagram of DC/DC boost battery charger control algorithms 180 in Mode 3 Control Library which is used in operation mode 3. Battery voltage controller 182 regulates battery voltage Vb to battery voltage reference Vbr by generating a DC current reference Ibstr in constant voltage mode, battery current controller 184 regulates battery current Ib to battery current reference Ibr by generating a DC current reference Ibstr in constant current mode. DC current controller 186 regulates boost current Ibst 58 (in FIG. 5) to DC current reference Ibstr by commanding Boost PWM 188 to generate PWM signals controlling IGBT switches 116, 118 of MFPCS 66 to charge On-Board Battery 68 with truck Alternator Power Source 70 (in FIG. 5).

Figure 10:
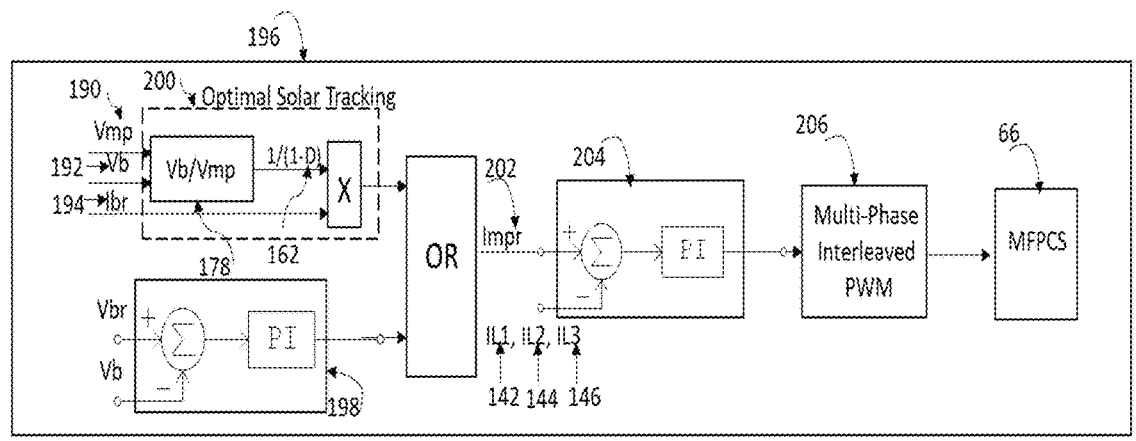
FIG. 10 illustrates the functional block diagram of interleaved multi-phase on-board battery charger control algorithms in Mode 4 control library as contemplated by one non-limiting aspect of the present invention.

FIG. 10 illustrates the functional block diagram of interleaved multi-phase on-board battery charger control algorithms 196 in Mode 4 Control Library which is used in operation mode 4. Battery voltage controller 198 regulates battery voltage to battery voltage reference Vbr by generating DC current reference Impr 202 in constant voltage mode. Optimal Solar Tracking unit 200 regulates battery current by generating DC current reference Impr 202 in constant current mode. In Optimal Solar Tracking unit 200, battery voltage Vb 192 and solar voltage Vmp 190 are used by function block 178 to derive the inverse duty cycle: $1/1-D$ (162)=Vb(192)/VMP(190). Solar current reference Impr 202 is related to battery charging current reference Ibr 194 by the expression: Impr=1/1−D×Ibr. Impr 202 is fed into multi-phase current controller 204 to regulate inductor currents $I_{L1}$ 142, $I_{L2}$ 144, $I_{L3}$ 146 of DC inductors 78 (in FIG. 6) by commanding Multi-Phase Interleaved PWM 206 to generate signals controlling IGBT switches 112, 114, 116, 118, 120, 122 of MFPCS 66 to charge On-Board Battery 68 with Solar Energy 80 (in FIG. 6).

Figure 11:
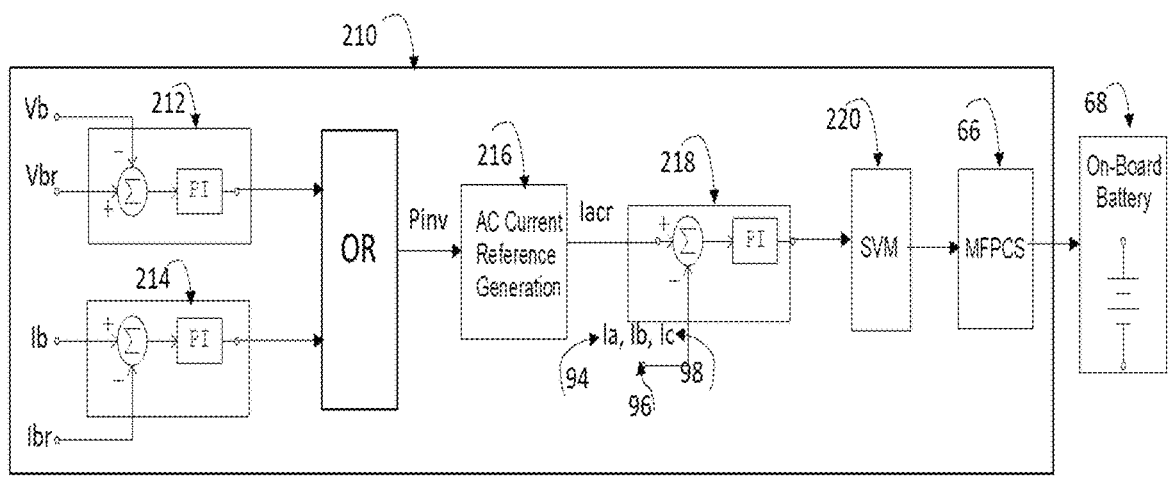
FIG. 11 illustrates the functional block diagram of PWM rectifier battery charger control algorithms in Mode 5 control library as contemplated by one non-limiting aspect of the present invention.

FIG. 11 illustrates the functional block diagram of PWM rectifier battery charger control algorithms 210 in Mode 5 Control Library which is used in operation mode 5. Battery voltage controller 212 regulates battery voltage Vb to battery voltage reference Vbr by generating an inverter power command Pinv in constant voltage mode, battery current controller 214 regulates battery current Ib to battery current reference Ibr by generating an inverter power command Pinv in constant current mode. AC Current Reference Generation unit 216 produces AC current references Iacr with the inverter power command Pinv. AC current controller 218 regulates AC currents $I_a$ 94, $I_b$ 96, $I_c$ 98 in LCL Filter Plus Isolation Transformer 88 by commanding Space Vector Modulation (SVM) 220 to generate PWM signals controlling IGBT switches 112, 114, 116, 118, 120, 122 of MFPCS 66 to charge On-Board Battery 68 with AC Grid Power 90 (in FIG. 6).

Figure 12:
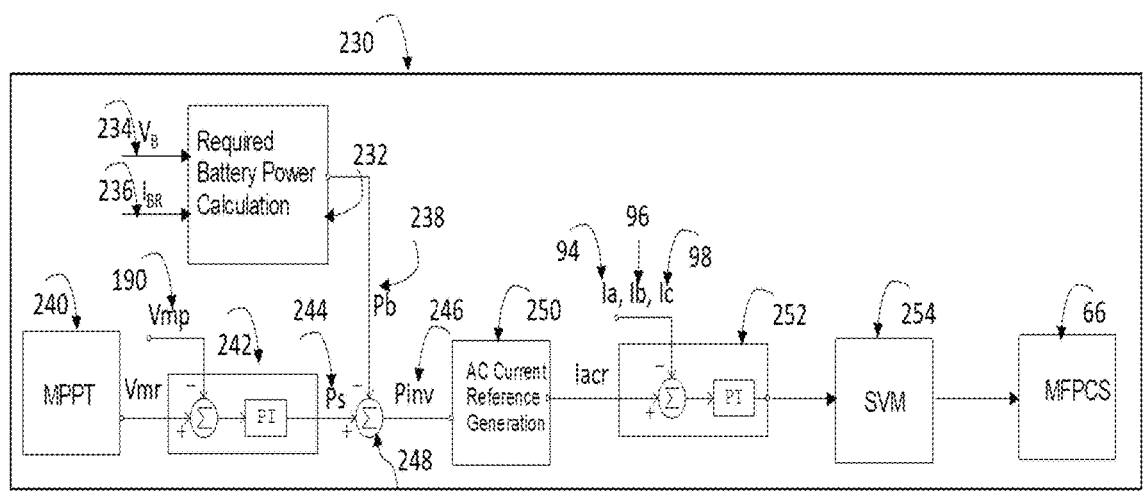
FIG. 12 illustrates the functional block diagram of three phase grid tied inverter and on-board battery charger control algorithms in Mode 6 control library as contemplated by one non-limiting aspect of the present invention.

FIG. 12 illustrates the functional block diagram of three phase grid-tied inverter and direct on-board battery charger control algorithms 230 in Mode 6 Control Library which is used in operation mode 6. Maximum Power Point Tracking (MPPT) unit 240 extracts the maximum solar power by producing a dynamic voltage reference Vmr to DC voltage controller 242. DC voltage controller 242 regulates solar power output voltage Vmp 190 to dynamic voltage reference Vmr by generating solar power command Ps 244. Required Battery Power Calculation 232 produces required on-board battery charging power Pb 238 based on on-board battery charging current reference $I_{BR}$ 236 and on-board battery voltage $V_B$ 234. Inverter command generation unit 248 produces inverter power command Pinv 246 by subtracting required on-board battery charging power Pb 238 from solar power command Ps 244. Inverter power command Pinv 246 is then fed to AC Current Reference Generation 250 to create a current reference Iacr for AC current controller 252 which regulates AC currents $I_a$ 94, $I_b$ 96, $I_c$ 98 in LCL Filter Plus Isolation Transformer 88 by commanding SVM 254 to generate PWM signals controlling IGBT switches 112, 114, 116, 118, 120, 122 of MFPCS 66 to charge On-Board Battery 68 and produce AC Grid Power with Solar Energy 90 (in FIG. 6).

Figure 13:
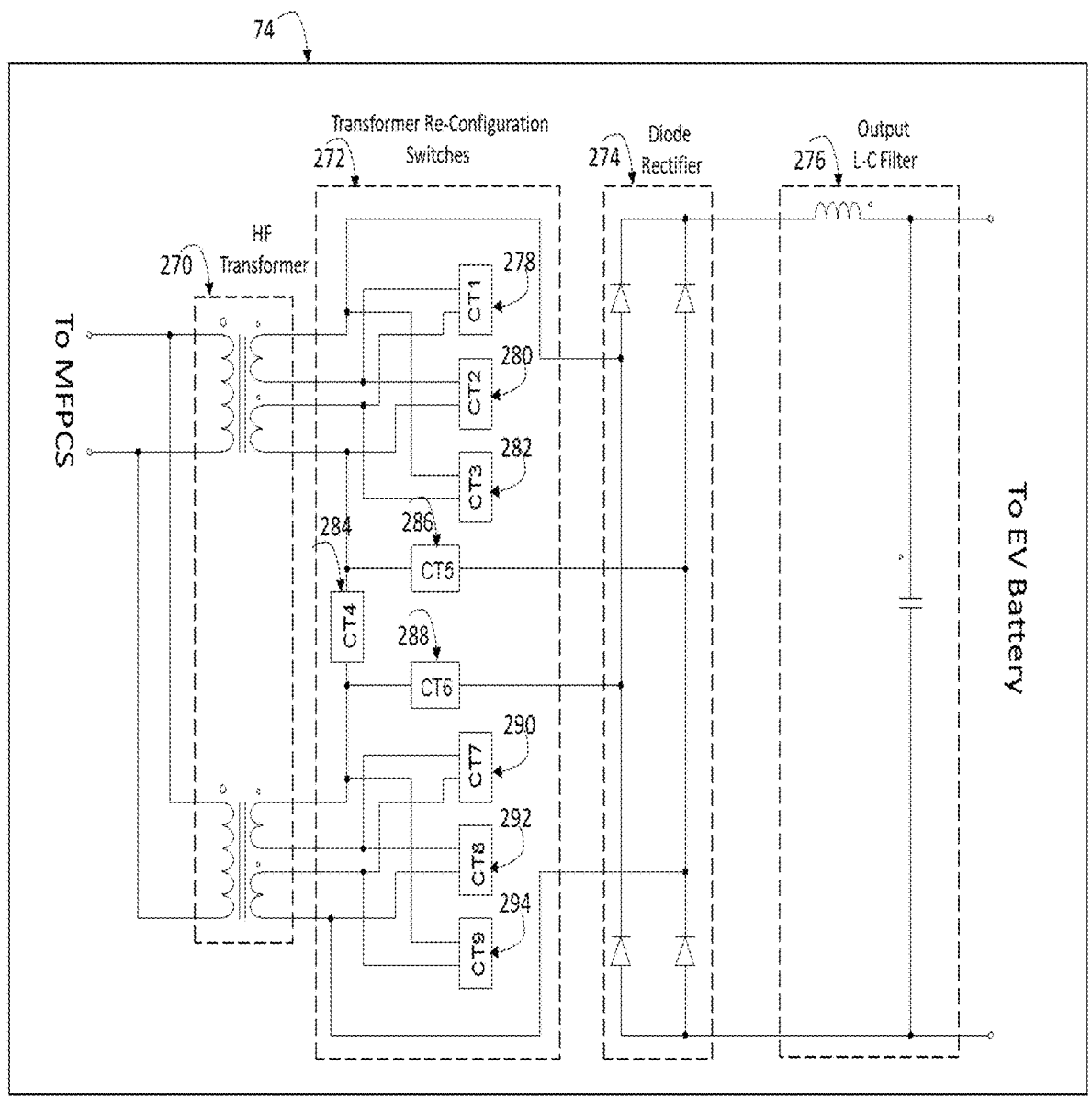
FIG. 13 schematically illustrates a universal battery interface as contemplated by one non-limiting aspect of the present invention.

FIG. 13 illustrates Universal Battery Interface 74 comprising two identical HF transformers 270 each having one primary winding and two separated secondary windings, Transformer Reconfiguration Switches 272 reconfiguring HF transformer's secondary windings in series and/or parallel, Diode Rectifier circuit 274 converting an AC voltage pulse trains to DC ones, Output L-C Filter 276 eliminating HF switching harmonic components, may be reconfigured by MFPCS 66 (in FIG. 3) through opening and closing of switches CT1 278, CT2 280, CT3 282, CT4 284, CT5 286, CT6 288, CT7 290, CT8 292, CT9 294 based on transformer re-configuration switch control table 300 as shown in FIG. 14 so that it can interface with EV battery with any voltage range, for example 150 v-210V, 300 v-420 v, 600 v-840 v.

What is claimed is:

1. A mobile EV charging system mountable on a vehicle, comprising:
   a MFPCS module having a IGBT module, an AC port, and a DC port wherein the DC port is adapted to receive power from a solar power source or an on-board battery and the AC port is adapted to output power to an EV or send power to and receive power from an AC grid;
   an onboard battery coupled to the MFPCS module to charge the on-board battery or to supply power to charge the battery in an electric vehicle through the MFPCS module;
   a DSP controller having a library with a plurality of modes to control the MFPCS module by supplying control signals to a IGBT gate driver to control the MFPCS module; and
   a universal battery interface coupled to the AC port of the MFPCS and the on-board battery to supply voltage and current suitable for a plurality of different EV vehicle charging systems wherein the plurality of modes includes mode 1 to charge a battery of an EV by the onboard battery, mode 4 to charge the onboard battery by a solar power source; and mode 5 to charge the on-board battery with the AC grid.

2. The EV charging system of claim 1, further comprising a voltage and a current sensor coupled to the DC port to measure DC voltage and DC current at the DC port and inputting the sensor values to the DSP and further comprising at least one AC current sensor coupled to the AC port to measure current at the AC port and inputting the current measurements to the DSP.

3. The EV charging system of claim 2, further comprising mode 3 to couple the MFPCS module to the charging system of the vehicle to charge the onboard battery.

4. The EV charging system of claim 2, further comprising mode 2 to couple the MFPCS module to the charging system of the vehicle to charge the battery of an EV.

5. The EV charging system of claim 3, wherein the charging system of the vehicle includes an alternator.

6. The EV charging system of claim 4, wherein the charging system of the vehicle includes an alternator.

7. The EV charging system of claim 2, where in the AC port is adapted to receive three phase power from the grid.

8. The EV charging system of claim 2, further including mode 6 wherein power from a solar source is also used to supply power to the AC grid when it is used to charge the onboard battery.

* * * * *